US009664325B2

(12) United States Patent
Yamada et al.

(10) Patent No.: US 9,664,325 B2
(45) Date of Patent: May 30, 2017

(54) PIPE CONNECTING DEVICE WITH FASTENING COMPLETION STRUCTURE

(71) Applicant: NIPPON PILLAR PACKING CO., LTD., Osaka-shi, Osaka (JP)

(72) Inventors: Masateru Yamada, Osaka (JP); Takayuki Kishimoto, Osaka (JP); Takeshi Nakagawa, Osaka (JP); Kiyotaka Omae, Osaka (JP)

(73) Assignee: NIPPON PILLAR PACKAGING CO., LTD., Osaka-Shi (JP)

( * ) Notice: Subject to any disclaimer, the term of this patent is extended or adjusted under 35 U.S.C. 154(b) by 0 days.

(21) Appl. No.: 14/162,067

(22) Filed: Jan. 23, 2014

(65) Prior Publication Data

US 2014/0210205 A1    Jul. 31, 2014

(30) Foreign Application Priority Data

Jan. 28, 2013 (JP) .................................. 2013-013425
Jan. 28, 2013 (JP) .................................. 2013-013426

(51) Int. Cl.
*F16L 47/04*    (2006.01)
*B25B 13/50*    (2006.01)

(52) U.S. Cl.
CPC .......... *F16L 47/04* (2013.01); *B25B 13/5016* (2013.01)

(58) Field of Classification Search
CPC ..... F16L 19/02; F16L 19/028; F16L 19/0283; F16L 19/025; F16L 47/04; F16L 33/223
See application file for complete search history.

(56) References Cited

U.S. PATENT DOCUMENTS

| 1,195,433 | A | * | 8/1916 | Bailey ........................... 285/247 |
| 4,040,889 | A | * | 8/1977 | Acda ............................. 156/498 |
| 4,508,374 | A | * | 4/1985 | Kantor ................ F16L 19/0283 285/319 |
| 4,951,976 | A | * | 8/1990 | Boelkins ........................ 285/114 |
| 6,773,039 | B2 | * | 8/2004 | Muenster et al. ............ 285/259 |
| 2005/0097763 | A1 | * | 5/2005 | Williams et al. ........... 33/501.45 |
| 2008/0061551 | A1 | * | 3/2008 | Simmons et al. ............ 285/249 |
| 2011/0210544 | A1 | * | 9/2011 | Teshima .............. F16L 19/0283 285/334.5 |

FOREIGN PATENT DOCUMENTS

| FR | 2407419 | * 10/1977 |
| JP | 2000-354973 | 12/2000 |
| JP | 2010-127421 | 6/2010 |
| JP | 2010-127427 | 6/2010 |

* cited by examiner

*Primary Examiner* — David E Bochna
*Assistant Examiner* — James Linford
(74) *Attorney, Agent, or Firm* — Rankin, Hill & Clark LLP

(57) ABSTRACT

A pipe connecting device having a joint body including a fitting cylinder to which a flared synthetic resin-made tube is to be externally fitted, an external thread formed on a radially outward side of the fitting cylinder; and a union nut including an internal thread screwed with the external thread, and a tube pressing portion that presses a diameter changing portion formed between a flared portion in the tube, and a non-flared portion, in the direction of the axis. In a fastening completion state in which the tube pressing portion is caused to press the diameter changing portion by a screw advancement of the union nut, the screw advancement being produced by screwing the internal thread to the external thread, positions of a basal end of the external thread and a tip end of the union nut in the directions of axes coincident with each other.

5 Claims, 13 Drawing Sheets

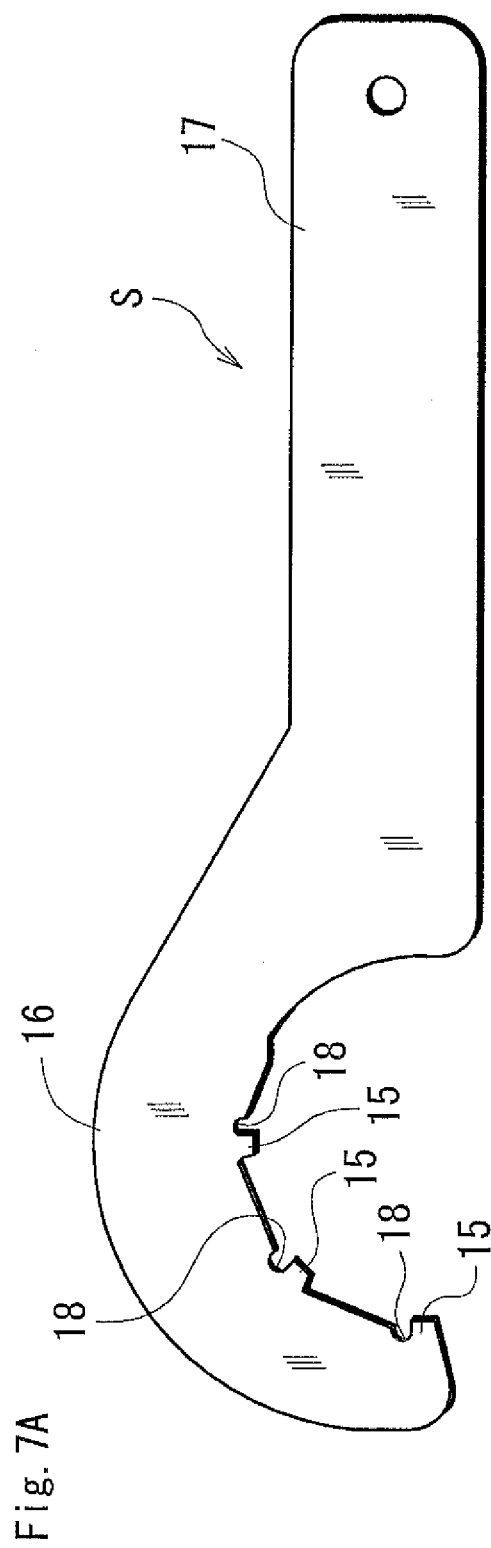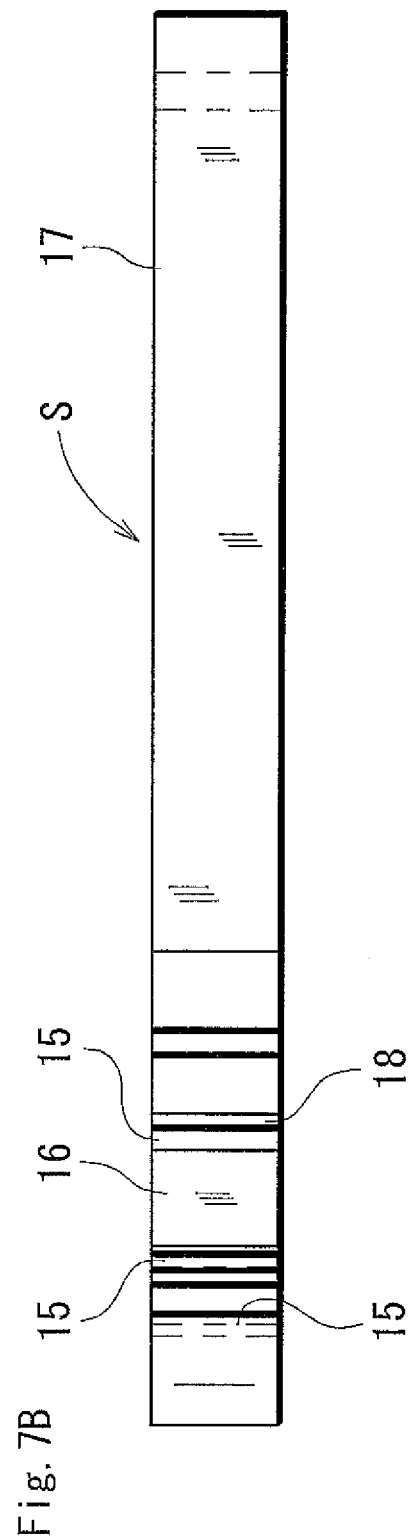
Fig. 7A
Fig. 7B

PIPE CONNECTING DEVICE WITH FASTENING COMPLETION STRUCTURE

BACKGROUND OF THE INVENTION

1. Field of the Invention

The present invention relates to a pipe connecting device which is preferably used in piping for a liquid having high purity or ultrapure water to be handled in a production process of various technical fields such as production of semiconductor devices, production of medical equipment and medicines, food processing, and chemical industry, and which is used as means for connecting a fluid apparatus such as a pump, a valve, or a filter, or a tube that is a fluid transfer path.

2. Explanation of Related Art

As a pipe connecting device (pipe joint) of this kind, for example, a pipe connecting device disclosed in Patent Literature 1 is known. Namely, the disclosed resin pipe joint has a configuration where, by a screw advancement of a union nut (2) caused by screwing an internal thread (8) to an external thread (5) in a state where a tube (3) is externally fitted to a fitting cylinder (4) of a joint body (1) to form a flared portion (3A), a tube pressing portion (seal pressing portion: 10) is caused to press a flaring changing region (9).

In the pipe connecting device disclosed in Patent Literature 2, the worker holds a union nut in the hand and fingers, and then rotates and fastens the union nut, thereby connecting a tube to a joint body in a sealed state. In order to allow the fastening torque to be transmitted as easily as possible, small antislip asperities (knurling) are continuously formed on the outer periphery of the union nut in the circumferential direction.

In the configuration where the means for manually rotating and fastening the union nut is employed, a tool for rotation is not necessary, and there is no inconvenience that, when the worker forgets to bring the tool, the operation is disabled. The pipe connecting device has an advantage that the pipe connecting device can be assembled easily and conveniently. In order that a nut for the pipe joint is sufficiently fastened by an operation force manually applied by the worker so as to attain a satisfactory seal, however, an accordingly large force is required, and there are disadvantages such as that the nut is not suitable for connecting large pipes, and that workers are often limited.

As disclosed in Patent Literature 3, on the other hand, a tool by which a union nut can fastened satisfactorily and firmly in simple operation is provided. When a hook wrench which is a rotary tool is used, a union nut can be firmly fastened although the tool operation is performed in a relatively simple manner. Therefore, the tool has an advantage that a pipe connecting device can be assembled irrespective of whether the worker has a sufficient physical strength or not, or whether the worker is skillful or not.

However, a space for rotationally operating a hook wrench is necessary. Therefore, the tool is inadequate to be used in a situation where the space around a pipe connecting device is small, thereby causing a disadvantage of a limited service situation. In the disclosure of Patent Literature 3, the hook wrench is made of plastic so that it can be preferably used for rotating a synthetic-resin made union nut.

In a pipe connecting device, a work of fastening a union nut is completed when a screw advancement of the union nut due to fastening causes a tube pressing portion to strongly press a tube fitted onto a joint body and a sealed state is attained. In the configuration where a union nut is fastened with the hand and fingers, considerable effort must be exerted, but there is an advantage that a rapid torque increase caused by pressing of the tube pressing portion against the tube allows the fastening completion state or a state just before the completion to be detected in a relatively easy manner.

By contrast, in the configuration where fastening is performed by using a hook wrench by which the rotation force is amplified, the torque increase tends to be hardly sensuously detected as compared with the case where a union nut is directly operated by the hand and fingers. Therefore, there is a possibility that further disadvantages that a union nut is often excessively fastened, and that, conversely, fastening is ended in a state where a union nut is somewhat loosely fastened may occur.

Therefore, both the configuration where fastening is performed by the hand and fingers, and that where fastening is performed by using a hook wrench have advantages and disadvantages, and are adequately selectively used on a case-by-case basis.

As described above, a synthetic-resin made pipe connecting device is used in piping for a liquid which must be delicately handled in fields such as production of medical equipment and medicines, and food processing, and often disposed in complicated pipe equipment. Therefore, a pipe joint is often disposed in a very small space such as a place between a pump and tank which are placed near a wall or in a high place.

In both the configuration where fastening is performed by the hand and fingers, and that where fastening is performed by using a hook wrench, therefore, it is often that the space is so small that operation of a union nut is difficult, or that the fastening completion state is hardly checked. Particularly, leakage due to a failure in fastening or damage of a member caused by excessive fastening may occur. Even when either of the fastening structures is employed, therefore, the check of whether the fastening completion state is attained or not is very important.

As described above, in a pipe connecting device which is often disadvantageous in working conditions and space, the fastening completion state tends to be hardly recognized. Therefore, there is room for improvement with respect to "how to correctly recognize the fastening completion state".

Patent Literature 1: Japanese Patent Application Laid-Open No. 2010-127421

Patent Literature 2: Japanese Patent Application Laid-Open No. 2010-127427

Patent Literature 3: Japanese Patent Application Laid-Open No. 2000-354973

SUMMARY OF THE INVENTION

In view of the above-described circumstances, it is an object of the invention to provide a pipe connecting device in which the check of whether the fastening completion state is attained or not is facilitated by further improving the structure, and which is improved so as to satisfactorily achieve a desired joint function.

The invention provides a pipe connecting device characterized in that the device has: a joint body 1 including a fitting cylinder 4 to which a flared synthetic resin-made tube 3 is to be externally fitted, and an external thread 5 which is formed on a radially outward side of the fitting cylinder 4; and a union nut 2 including an internal thread 9 which is screwed with the external thread 5, and a tube pressing portion 11 which presses a diameter changing portion 3B formed between a flared portion 3A in the tube 3, and a non-flared portion 3C, in the direction of the axis Q, and, in a fastening completion state in which the tube pressing portion 11 is caused to press the diameter changing portion 3B by a screw advancement of the union nut 2, the screw advancement being produced by screwing the internal thread 9 to the external thread 5, the positions of the basal end 5b of the external thread 5 and the tip end 2a of the union nut 2 in the directions of the axes P, Q are coincident with each other.

According to the invention, when the coincidence of the axial position of the basal end of the external thread and that of the tip end of the union nut is visually checked, it is possible to easily determine whether the fastening completion state is attained or not. Therefore, the workability of fastening is excellent. When, as a result of a rotational operation, the tip end of the fastening union nut, and the basal end of the external thread of the joint body coincide with each other, and a state where the external thread which has been visually checkable cannot be seen (for reference, the state drawn in the right side of the sheet of FIG. 10) is formed, for example, the operation of rotating the union nut may be stopped. At the moment, the fastening completion state is attained.

Therefore, it is possible to provide a pipe connecting device in which the check of whether the fastening completion state is attained or not is facilitated by further improving the structure, and which is improved so as to satisfactorily achieve a desired joint function.

The invention is characterized in that, in the pipe connecting device according to a first aspect of the present invention, the joint body 1 has: a small-diameter trunk portion 6 which has an outer diameter that is equal to or smaller than the diameter of a root 5a of the external thread 5, and which is continued to the basal end of the external thread 5; and a torque receiving portion 7 which is formed continuously with the small-diameter trunk portion 6, and which can unswingably support the joint body 1, and the diameter of the torque receiving portion 7 is set to a value which is equal to or smaller than the diameter of the root 5a of the external thread 5, and equal to or larger than the diameter of the small-diameter trunk portion 6.

According to the invention, the torque receiving portion is configured so as to have a relatively small diameter. Even in a situation where the coincidence of the axial position of the basal end of the external thread and that of the tip end of the union nut is compelled to be visually checked in an oblique direction from the side of the torque receiving portion because of conditions such as the peripheral space, therefore, the visual check can be performed without being obstructed by the torque receiving portion.

While the small-diameter trunk portion and the torque receiving portion are provided with necessary strength, therefore, viewing in an oblique direction from the side of the torque receiving portion is facilitated. Also from this point of view, it is possible to realize a pipe connecting device in which the check of whether the fastening completion state is attained or not is facilitated.

The invention is characterized in that, in the pipe connecting device according to the first aspect of the present invention, both the external thread 5 and the internal thread 9 which is screwed with the external thread are formed into a trapezoidal thread.

According to the invention, the external thread of the joint body, and the internal thread of the union nut are formed by a trapezoidal thread, and hence the width and pitch of the ridges are larger than those in a usual screw, so that the threads can be easily seen. Therefore, the manner in which the external thread is gradually screwed into the union nut by the screw advancement of the union nut to hide therein can be easily visually checked, and the workability of fastening is improved. Moreover, the strength of the ridges (thread line) can be enhanced, and therefore the configuration is suitable for production using a low-strength material which is inferior in strength as compared with a metal, such as a synthetic resin.

The invention is characterized in that, in the pipe connecting device according to the first aspect of the present invention, the device has a testing jig T which is insertable between the tip end 2a of the union nut 2 and the torque receiving portion 7, and the thickness of the testing jig T coincides with the dimension of a gap which is formed between the tip end 2a of the union nut 2 and the torque receiving portion 7 in a refastened state where, in the fastening completion state, the union nut 2 is further rotated by a predetermined degree in the fastening direction.

According to the invention, there is an advantage that, although a simple operation is performed in which the testing jig is inserted between the tip end surface of the union nut and the torque receiving portion to check whether a gap exists between the tip end surface of the union nut and the torque receiving portion or not, it is possible to easily confirm that refastening is completed, or that the normal refastening degree is attained.

The invention is characterized in that, in the pipe connecting device according to the first aspect of the present invention, the union nut 2 has a nut thinned portion 2A including the internal thread 9, and a nut thickened portion 2B including the tube pressing portion 11, grooves or recesses 12 which are used in forced swinging while being engaged with claws 15 of a hook wrench S are formed in an outer peripheral portion of the nut thickened portion 2B, and the union nut is made of a synthetic resin having a transparency at which a radially inner side of the nut thinned portion 2A is visible from a radially outer side.

According to the invention, the union nut has the nut thinned portion through which the interior can be seen, and therefore the fastening operation can be performed while transparently checking the screwed state between the internal thread and the external thread. As compared with the case where the interior cannot be seen, it is possible to visually check whether the fastening completion state is attained in a small working environment or in a complicated portion or not, whether the state approaches the fastening completion state or not, and the like, and the workability is excellent.

Moreover, the grooves or recesses which are to be engaged with the claws of the hook wrench, and which are portions receiving the rotary torque are formed in the nut thickened portion in which the radial thickness is larger than that of the nut thinned portion, and therefore it is possible to perform a rational design in which the union nut can be made small in size while providing a sufficient strength.

As a result, it is possible to provide a further improved pipe connecting device in which the check of whether the fastening completion state is attained or not is facilitated by the improved structure although a hook wrench having an excellent workability of fastening the union nut is used.

The invention is characterized in that, in the pipe connecting device according to a second aspect of the present invention, the grooves or recesses 12 are deep grooves which extend in the direction of the axis Q, and shallow grooves 13 which are impossible to be used in forced swinging while being engaged with the claws 15 of the hook wrench S are formed in an outer peripheral portion of the nut thinned portion 2A in a state where the grooves are continuous to the deep grooves 12, respectively.

According to the invention, the deep grooves which function as the grooves or the recesses, and the shallow grooves which are formed in the nut thinned portion 2A so as to be continuous thereto are disposed on the outer periphery, and therefore a manner of usage in which slide movement after the claws of the hook wrench are hooked on the shallow grooves causes the claws to be engaged with the deep grooves is enabled.

Namely, it is possible to provide a pipe connecting device which has an advantage that the shallow grooves can exert a guiding function which guides the claws of the hook wrench to the deep grooves, so that the usability is excellent, and a further advantage that the design can be improved by arranging the deep grooves and the shallow grooves in straight lines, respectively.

Even in the case where a pipe joint is placed in a narrow place or a less visible place, for example, the claws of the hook wrench can be facilitated to reach the deep grooves as compared with the case where only the deep grooves are formed. This is convenient.

The invention is characterized in that, in the pipe connecting device according to the second aspect of the present invention, mark portions k the radial positions of which are coincident with the radial positions of the grooves or recesses 12 are formed on the end surface in the direction of the axis Q of the nut thinned portion 2A.

According to the invention, the mark portions which are coincident in radial position related to the axis with the axis and the grooves or the recesses such as the deep grooves and the shallow grooves are formed on the tip end surface of the union nut. Therefore, there is an advantage that visual checking of the mark portions or touching of the mark portions with the finger facilitates the checking of the engagement positions of the claws of the hook wrench from the tip end side of the union nut.

The invention is characterized in that, in the pipe connecting device according to the second aspect of the present invention, the grooves or recesses 12 are formed so that, in the fastening completion state, the axial end of the external thread 5 which is set to be substantially equal in length to the internal thread 9 is approximately coincident in axial position with the axial ends of the grooves or recesses 12.

The invention is configured so that, in the fastening completion state, the axial end of the external thread which is set to be substantially equal in length to the internal thread is approximately coincident in axial position with the axial ends of the grooves or recesses. When the nut thinned portion is seen, therefore, it is possible to visually check the positional relationship between the axial end of the external thread and the axial ends of the grooves or the recesses, i.e., whether the fastening completion state is attained or not, or whether the state approaches the fastening completion state or not.

Therefore, also the fastening completion state can be determined based on the positional relationship between the axial end of the external thread of the joint body, and the axial ends of the grooves or recesses of the union nut, and it is possible to provide a pipe connecting device which has superior ease of use.

BRIEF DESCRIPTION OF THE DRAWINGS

FIG. 4 shows a pipe joint nut.

FIG. 5 shows the pipe joint nut.

FIG. 6 shows the pipe joint nut.

FIG. 7 shows a hook wrench, FIG. 7A is a front view, and FIG. 7B is a side view.

FIG. 12 shows a gap gauge.

FIG. 13 shows a manner of using the gap gauge.

DESCRIPTION OF THE PREFERRED EMBODIMENTS

Hereinafter, embodiments of the pipe connecting device of the invention will be described with reference to the accompanying drawings. In a joint body 1, it is defined that a torque receiving portion 7 is in the middle, the side of the direction in which the ends of members in the direction of the axis P exist is the tip end side, and the opposite side is the basal side. In a union nut 2, it is defined that the end where an internal thread 9 exists is the tip end side, and the opposite side is the basal side.

[Embodiment 1]

Figure 1:
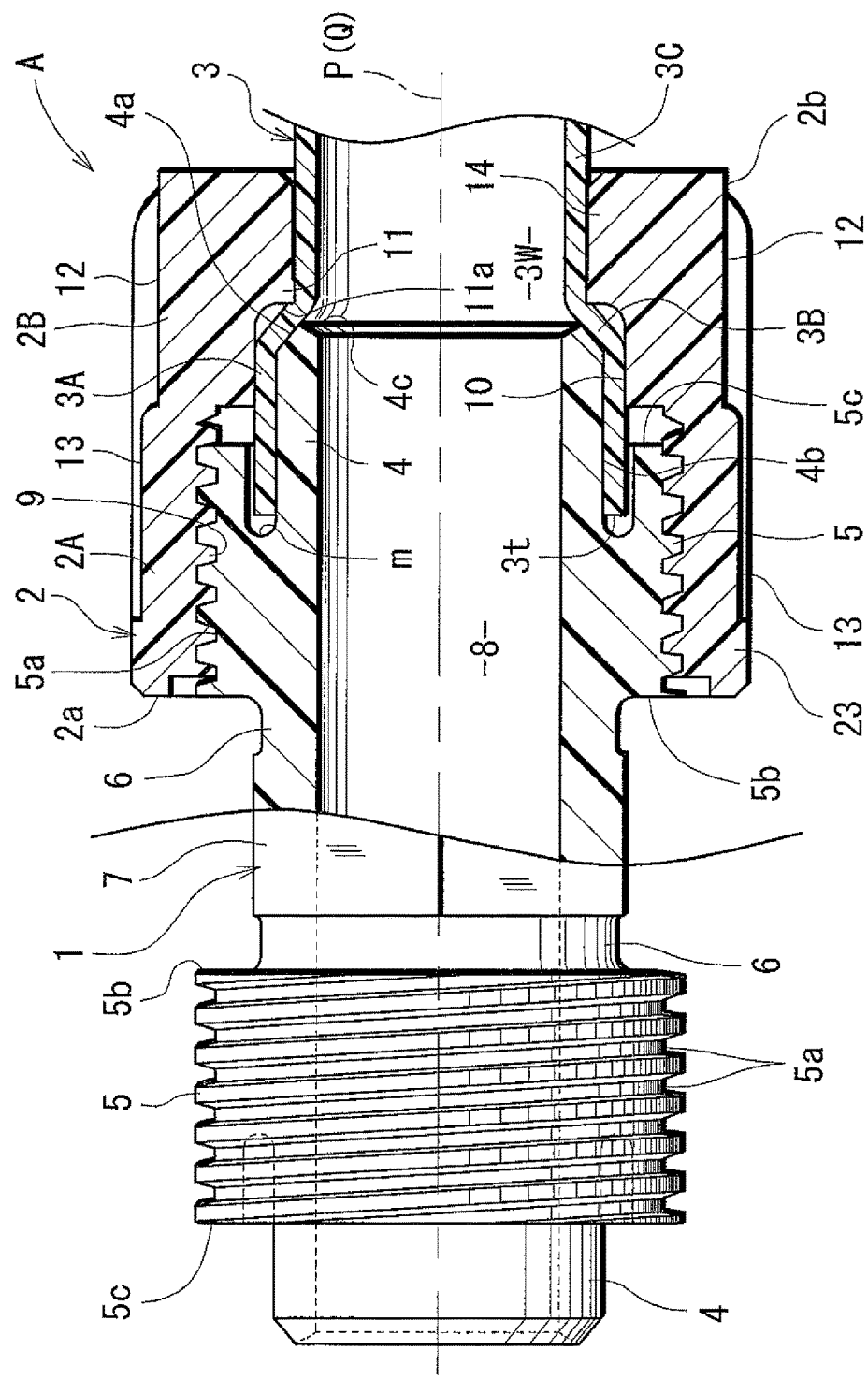
FIG. 1 is a partially cutaway side view showing a pipe connecting device.
Figure 11:
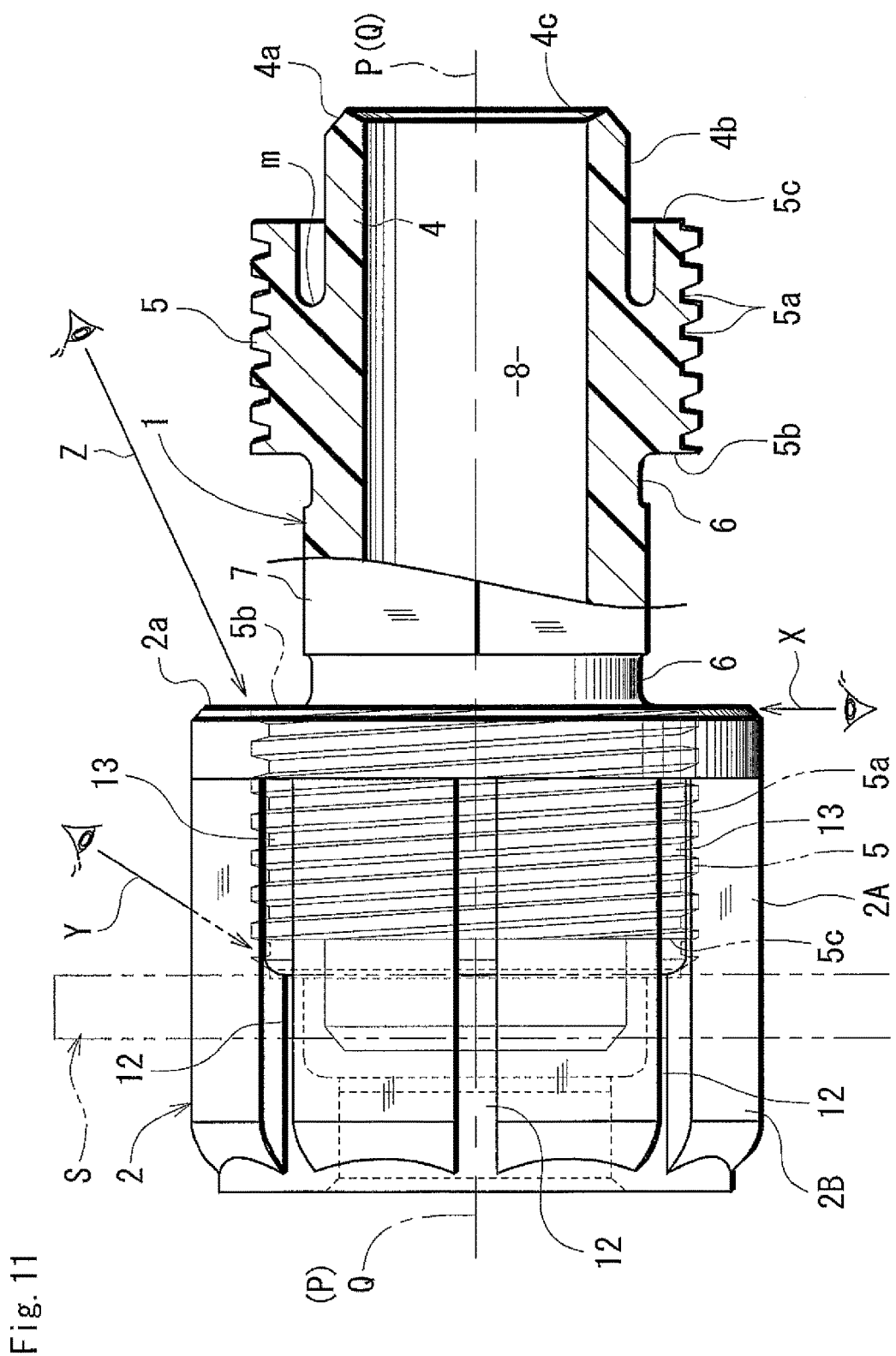
FIG. 11 is an imaginary view showing the manner of seeing through an external thread from the radially outward side of the pipe joint nut.

FIGS. 1 and 11 show a pipe connecting device A. The pipe connecting device A communicatingly connects a tube 3 made of a fluorine resin (an example of a synthetic resin which is typified by PFA, PTFE, and the like) to a fluid apparatus such as a pump or a valve, or a tube of the same or different diameter, and is configured by two components or the joint body 1 made of a translucent fluorine resin (an example of a synthetic resin which is typified by PFA, PTFE, and the like), and the union nut 2 made of a translucent fluorine resin (an example of a synthetic resin which is typified by PFA, PTFE, and the like). FIG. 1 shows an assembled state (assemble completion state) in which the union nut 2 is fastened and the tube 3 is connected to the joint body 1 in a sealed state.

Figure 2:
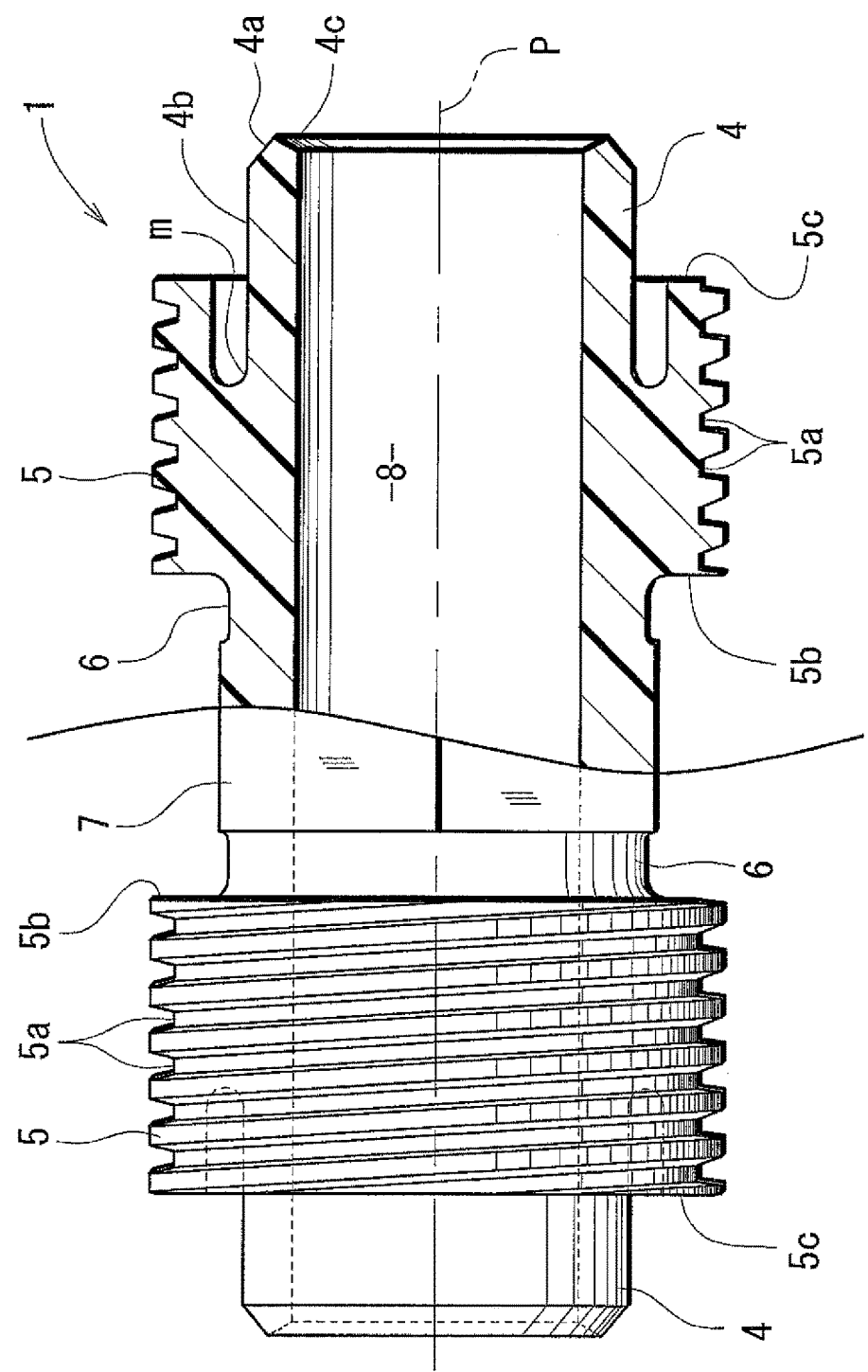
FIG. 2 is a partially cutaway side view of a joint body.
Figure 3:
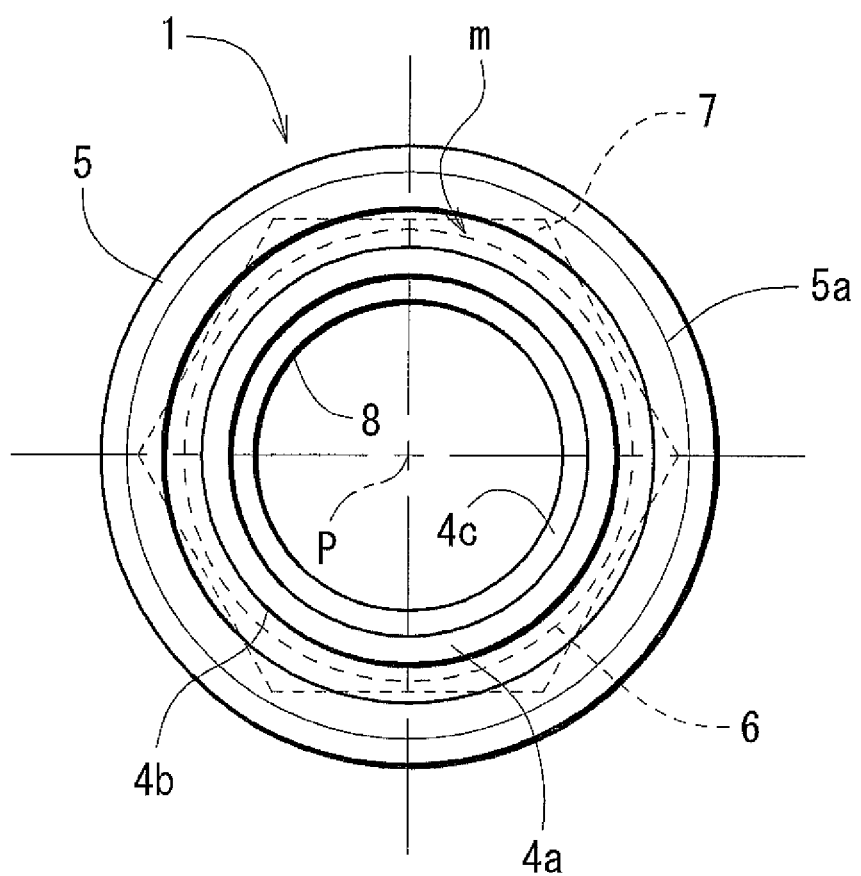
FIG. 3 is a front view of the joint body.

As shown in FIGS. 1 to 3, for example, the joint body 1 is a cylindrical component in which tubes 3 having the same diameter can be connected to the ends, respectively, which has the axis P, and which is bilaterally symmetric. The joint body includes a pair of fitting cylinders 4, a pair of external threads 5, a pair of small-diameter trunk portions 6, a torque receiving portion 7, and an internal flow path 8.

For the sake of simplicity, the following description will be made with respect to the case where the single union nut 2 is to be fastened as shown FIG. 1.

The fitting cylinder 4 is a portion to which a flared end portion of the tube 3 can be externally press-fitted, and which is most projected in the direction of the axis P.

The external thread 5 is a portion which is on the radially outward side of the fitting cylinder 4, which is formed on the side of the basal end of the fitting cylinder 4 in the direction of the axis P, and which is formed by a large-diameter trapezoidal thread.

The small-diameter trunk portion 6 is a cylindrical portion which has an outer diameter that is equal to or smaller than the diameter of the root 5a of the external thread 5, which is continued to the basal end of the external thread 5, and which is short in the direction of the axis P.

The torque receiving portion 7 is a hexagonal nut-like portion which can unswingably support the joint body 1, and which is formed between the small-diameter trunk portions 6, 6 in continuous thereto.

The internal flow path 8 is a portion which is a circular tunnel passing through the joint body 1 in the direction of the axis P, and through which a to-be-transported fluid flows.

The fitting cylinder 4 has: a forward tapered outer peripheral surface 4a which can gradually flare the tube 3; a straight barrel outer peripheral surface 4b on which the flared portion (the portion which is in the tube 3, and which is flared) 3A of the tube 3 is externally fitted; and a cut surface 4c which is formed in the tip end of the inner peripheral side in a state where the diameter is larger the more advanced toward the tip end side. A peripheral groove m into which the flared portion 3A is to be inserted is blindly formed between a basal end portion of the fitting cylinder 4 and the radial portion of the external thread 5. The position of the tip end of the external thread 5 in the direction of the axis P is set to a substantially middle of the fitting cylinder 4 in the direction of the axis P.

The small-diameter trunk portion 6 is provided with an outer diameter the size of which substantially coincides with the median value of the radial width of the peripheral groove m, and continuous to the external thread 5 through a side peripheral wall (basal end) 5b which is formed in the basal end of the external thread 5, and which has a large diameter difference. In the hexagonal nut-like torque receiving portion 7, the dimension (the dimension of the portion to which a wrench is to be applied) of the opposed two surfaces is set to a value which is slightly larger than the diameter of the small-diameter trunk portion 6, and which is smaller than the maximum diameter of the peripheral groove m. Preferably, the dimension (the dimension of the portion having the largest diameter) of the opposed two edges is set to a value which is smaller than the diameter of the root 5a of the external thread 5.

As shown in FIGS. 1 and 4 to 6, the union nut 2 has a nut thinned portion 2A, a nut thickened portion 2B, the internal thread 9, a pressing inner peripheral portion 10, a tube pressing portion 11, deep grooves (an example of the grooves or the recesses) 12, and shallow grooves 13, and is formed by a material which is superior in transparency to the joint body 1.

The nut thinned portion 2A is a portion which is on the tip end side of the union nut 2 in the direction of the axis Q. The internal thread 9 which is formed by a trapezoidal thread that is screwable with the external thread 5 of the joint body 1 is formed in the inner periphery of the nut thinned portion, and the plurality of shallow grooves 13 which are formed at regular angular intervals in the circumferential direction in a state where the grooves extend along the direction of the axis Q are formed in the outer periphery. A flange portion 23 in which the shallow grooves 13 are not formed, and which has a flat outer peripheral surface is formed in the tip end of the nut thinned portion 2A.

The nut thickened portion 2B includes: the tube pressing portion 11 which is a basal end side portion of the union nut 2 in the direction of the axis Q, which is formed in the inner peripheral portion while being separated from the internal thread 9 in the direction of the axis Q, and which has the minimum diameter; and the pressing inner peripheral portion 10 which is formed between the tube pressing portion 11 and the internal thread 9 in the direction of the axis Q in a state where the diameter is larger than that of the tube pressing portion 11, and smaller than that of the internal thread 9.

Each of the deep grooves 12 which are formed in the outer periphery of the nut thickened portion 2B has a bottom surface 12a which has the same diameter as a small-diameter outer peripheral portion 2b that is formed in the basal end in a state where the portion has a flat outer peripheral surface in which the length in the direction of the axis Q is very short. The deep grooved are formed at regular angular intervals in the circumferential direction in a state where the grooves extend along the direction of the axis Q. Generally, the radial thickness of the nut thickened portion 2B is larger than that of the nut thinned portion 2A.

Figure 10:
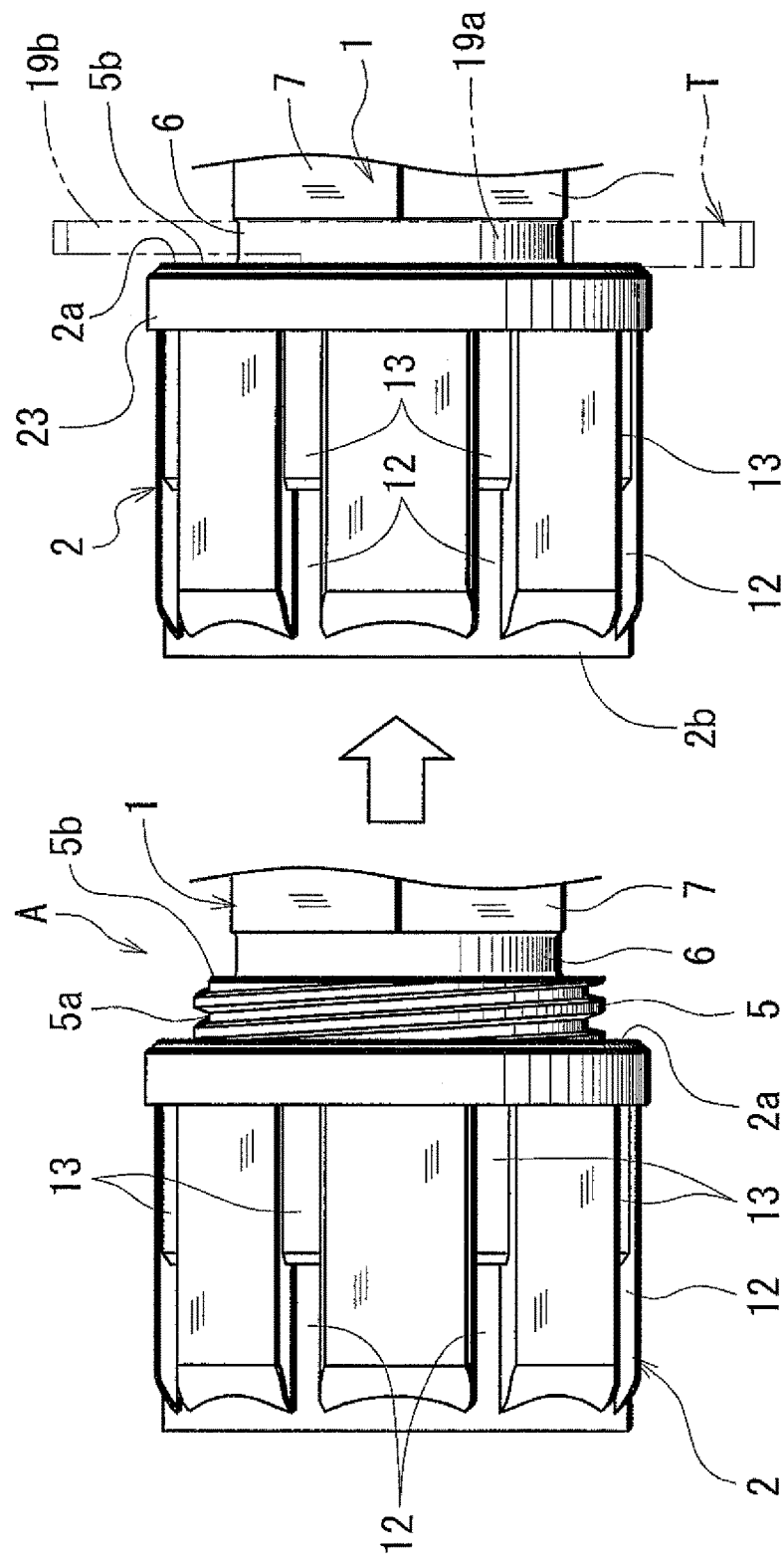
FIG. 10 is a function view showing a fastening situation of the pipe joint nut.

Each of the deep grooves 12 is a groove having a rectangular section which is relatively deep so that it can be forcedly swung by a hook wrench S toward both the fastening side and the loosening side while being engaged with a claw 15 of the hook wrench (see FIG. 10). The plurality of shallow grooves 13 are formed in a state where they are continuous to the deep grooves 12 in the direction of the axis Q, respectively. Namely, the number (eight) of the deep grooves 12 is equal to that of the shallow grooves 13, and the shallow grooves 13 are formed in the outer periphery of the nut thinned portion 2A in the form of grooves having a rectangular section and a shallow depth so that they cannot be engaged with the claws 15 of the hook wrench S and forced swinging is disabled.

The tube pressing portion 11 which as formed on the side of the inner periphery of the nut thickened portion 2B is a portion which, in the assembled state shown in FIG. 1, can press a diameter changing portion 3B formed between a flared portion 3A that is flared in the tube 3, and a natural-diameter portion 3C that is a non-flared portion, in the direction of the axis P (axis Q). The inner diameter of the tube pressing portion 11 is set to a value which is substantially equal to the diameter of the natural-diameter portion 3C, and a guide cylinder portion 14 having a diameter which is slightly larger is formed on the side of the basal end of the tube pressing portion 11.

A pressing face 11a of the tube pressing portion 11 is a side peripheral face which is perpendicular to the axis Q, and caused by fastening of the union nut 2 to strongly press the small-diameter side of the diameter changing portion 3B in the direction of the axis P, so that the diameter changing portion 3B and the tapered outer peripheral surface 4a can be in close contact with each other to attain a satisfactory sealed state.

In the assembled state shown in FIG. 1, the pressing inner peripheral portion 10 is formed into a cylindrical portion having a constant diameter having a value at which the portion is approximately in close contact with the outer periphery of the flared portion 3A that is press-fitted onto the fitting cylinder 4.

Figure 5A:
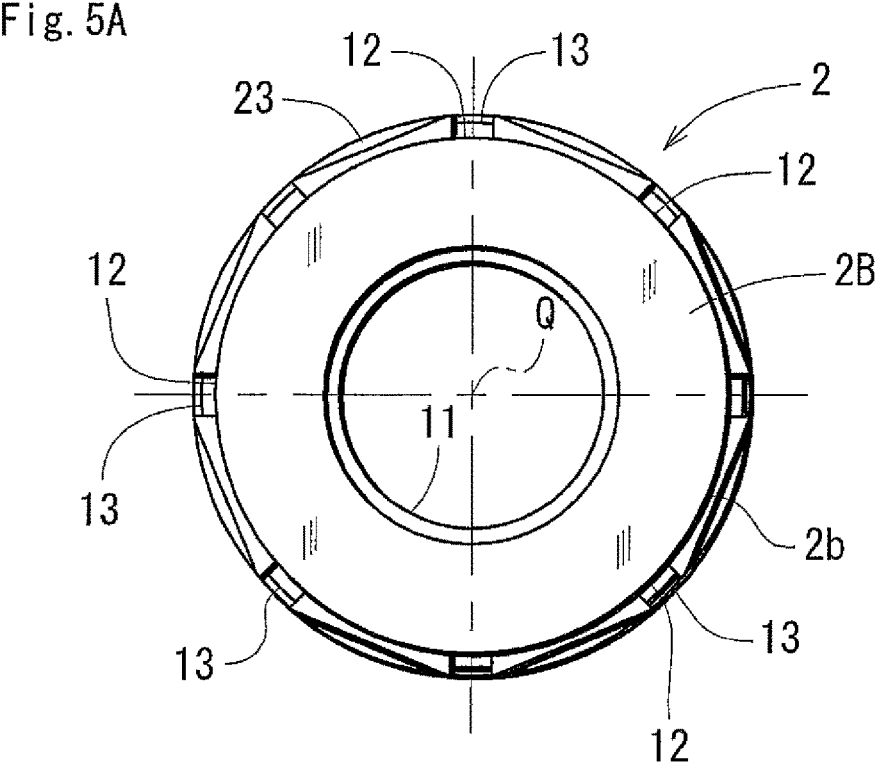
FIG. 5A is a front view.
Figure 5B:
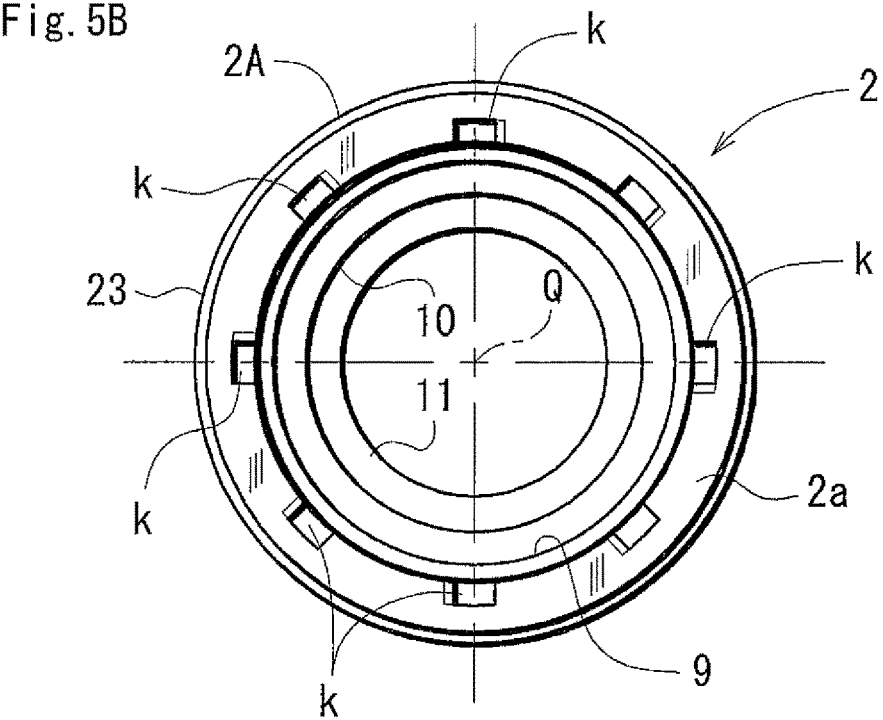
FIG. 5B is a rear view.
Figure 6A:
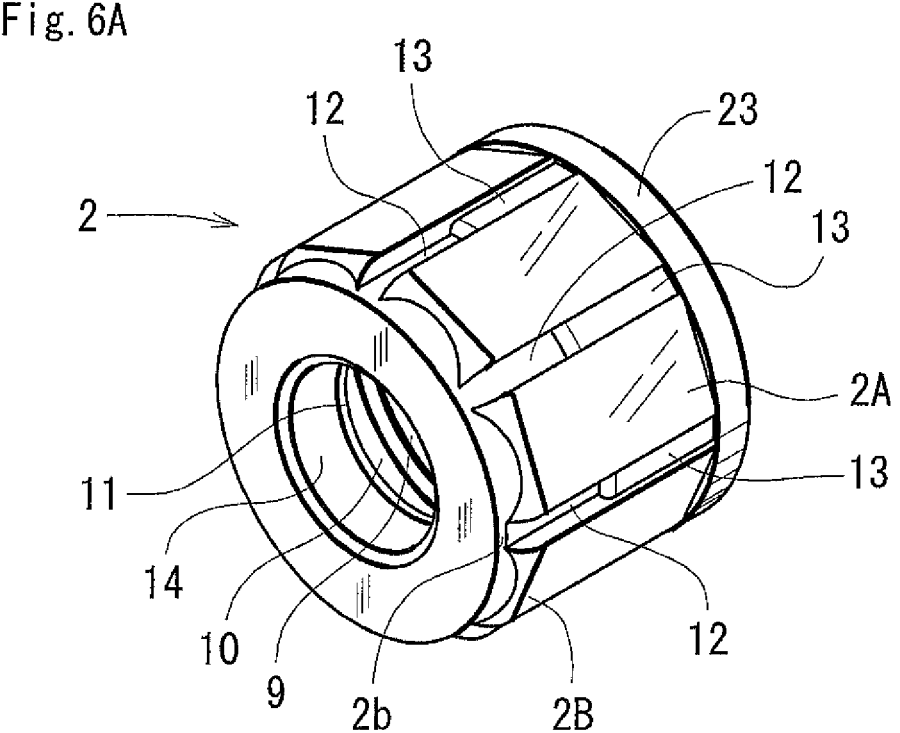
FIG. 6A is a perspective view as viewed downward from the front.
Figure 6B:
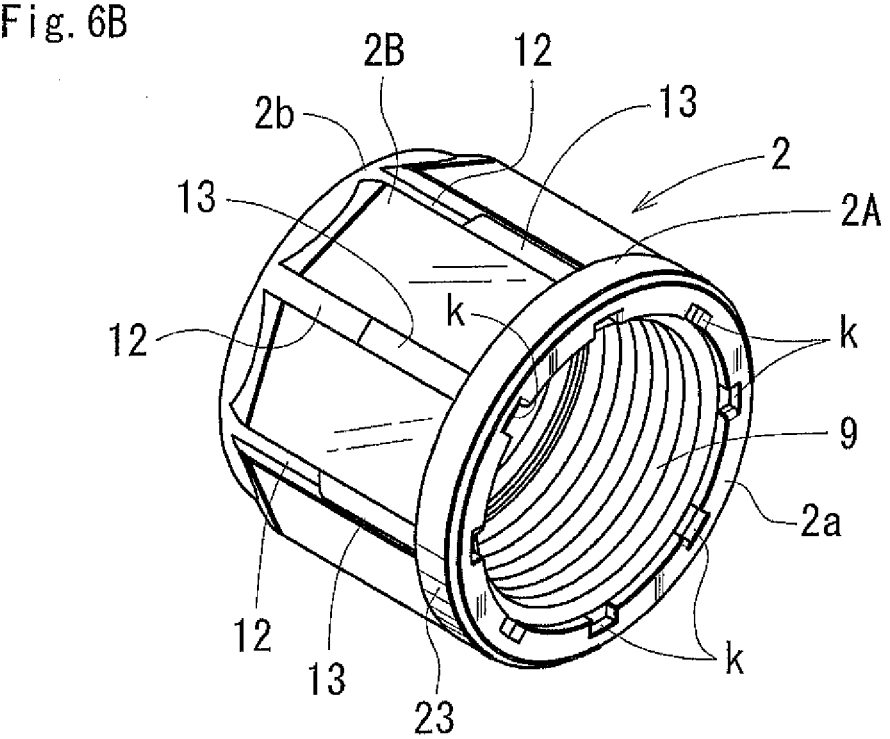
FIG. 6B is a perspective view as viewed downward from the back side.

As shown in FIGS. 5 and 6, a mark portion k the radial position of which is coincident with that of the corresponding deep groove 12 (and the shallow groove 13) is formed in eight places in total on the tip end surface (tip end) 2a that is the end surface in the direction of the axis Q of the nut thinned portion 2A. Each of the mark portions k is formed by a recess which is opened in the inner peripheral side of the tip end surface 2a, and in which the shape as viewed in the direction of the axis Q is rectangular.

The end portion of the tube 3 is externally fitted and inserted onto the fitting cylinder 4 by forcibly pushing the tube 3 at normal temperature to be attached while being flared, by heating the tube with using a heating source so as to be easily deformed and then pushing it, or by previously flaring the tube end of the tube 3 with using a flaring machine (not shown) and then pushing it onto the fitting cylinder 4.

Then, the tube is inserted until the end surface 3t of the tube 3 is approximately positioned in a deep position of the peripheral groove m as shown in FIG. 1. Here, "tube end of the tube 3" which is externally fitted and attached onto the fitting cylinder 4 is a portion configured by the flared portion 3A which is to be externally fitted to the straight barrel outer peripheral surface 4b, and the diameter changing portion 3B which is to be externally fitted to the tapered outer peripheral surface 4a.

The diameter of an internal flow path 3W of the tube 3, and that of the internal flow path 8 of the joint body 1 are set to be equal to or substantially equal to each other in order to attain a smooth fluid flow. Alternatively, the diameters may be different from each other.

As shown in FIG. 1, namely, it is set so that, by a screw advancement in the direction of the axis P caused by the fastening of the union nut 2 due to screwing of the internal thread 9 to the external thread 5 in a state where the tube 3 is externally fitted and attached to the fitting cylinder 4, the diameter changing portion 3B is pressed by the tube pressing portion 11 in the direction of the axis P, and the pressing inner peripheral portion 10 is externally fitted to the flared portion 3A.

In addition, it is set so that, when the tip end surface 2a of the union nut 2 and the side peripheral wall 5b of the joint body 1 coincide with each other in the direction of the axis P (the state shown in FIG. 1), an assembling completion state is attained where the diameter changing portion 3B pressed by the tube pressing portion 11 and the tapered outer peripheral surface 4a are in close contact with each other to be satisfactorily sealed.

The term "coincide with each other" may be replaced with "end surfaces are aligned" or "flush with".

The work of forcedly swinging and fastening the union nut 2 is performed by using the hook wrench S shown in FIG. 7. The hook wrench S is a synthetic resin-made nut rotating tool including: a hook-like tip end portion 16 which is curved by about 180 deg.; a handle portion 17 which is to be held by the hand and fingers; and three claws 15 which are formed on the inner peripheral side of the tip end portion 16. The three claws 15 are set to have separation angles, size, and shape which enable the claws to be just engaged with the three deep grooves 12 that are continuous in the circumferential direction in the union nut 2.

In a root portion of each of the claws 15 in the downstream side in the rotation direction, a recessed portion 18 for enabling the claw to be surely engaged with one of the deep grooves 12 is formed.

Figure 8:
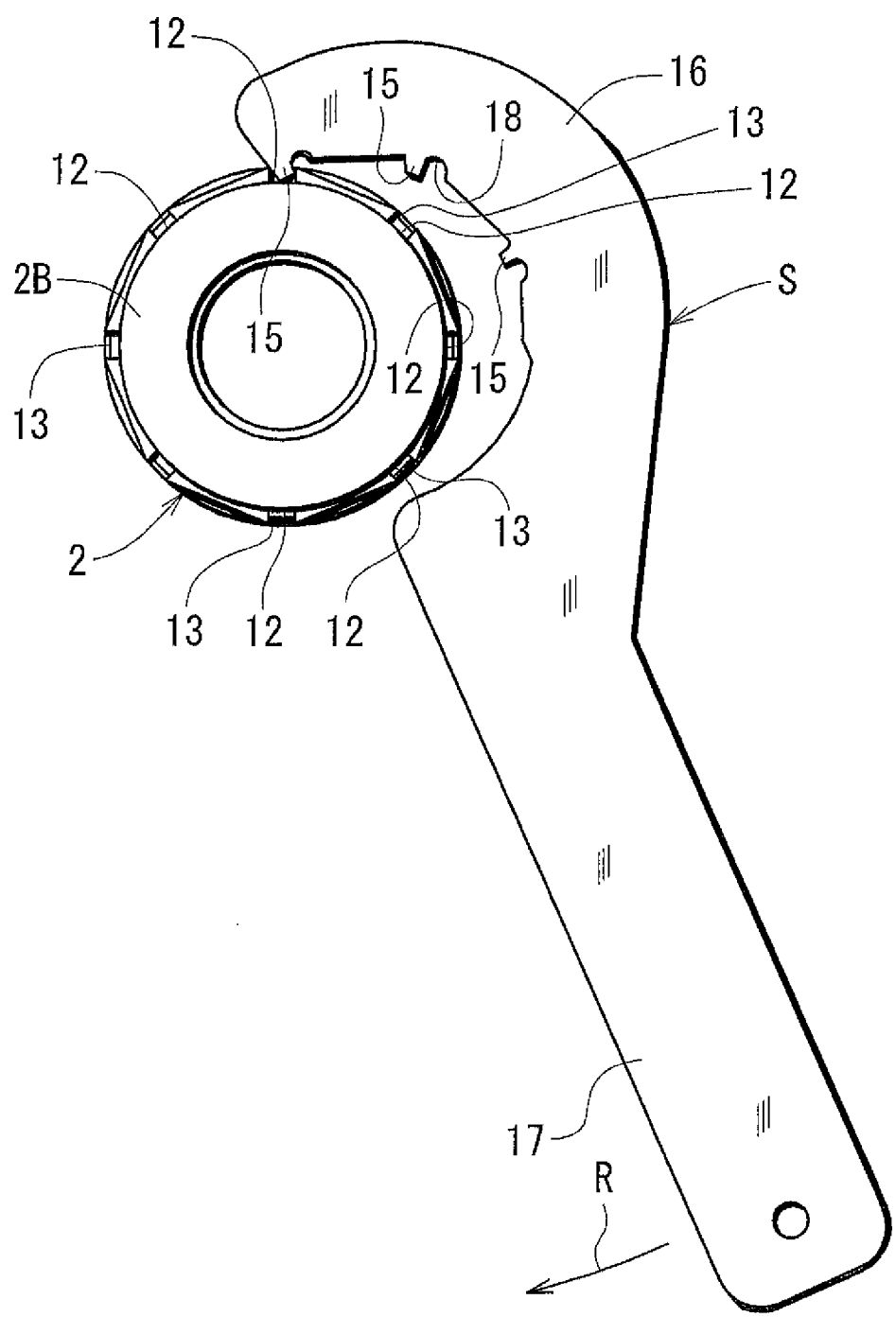
FIG. 8 is a function view showing a situation where the hook wrench is in the middle of being hooked on the pipe joint nut.

The union nut 2 is rotated by using the hook wrench S in the following manner. As shown in FIG. 8, first, the forward most claw 15 is inserted into one of the deep grooves 12 of the nut thickened portion 2B. Then, the handle portion 17 which is held by the hand and finger (not shown) is operated so as to be swingingly moved in the direction in which the tip end portion 16 approaches the union nut 2.

Figure 9:
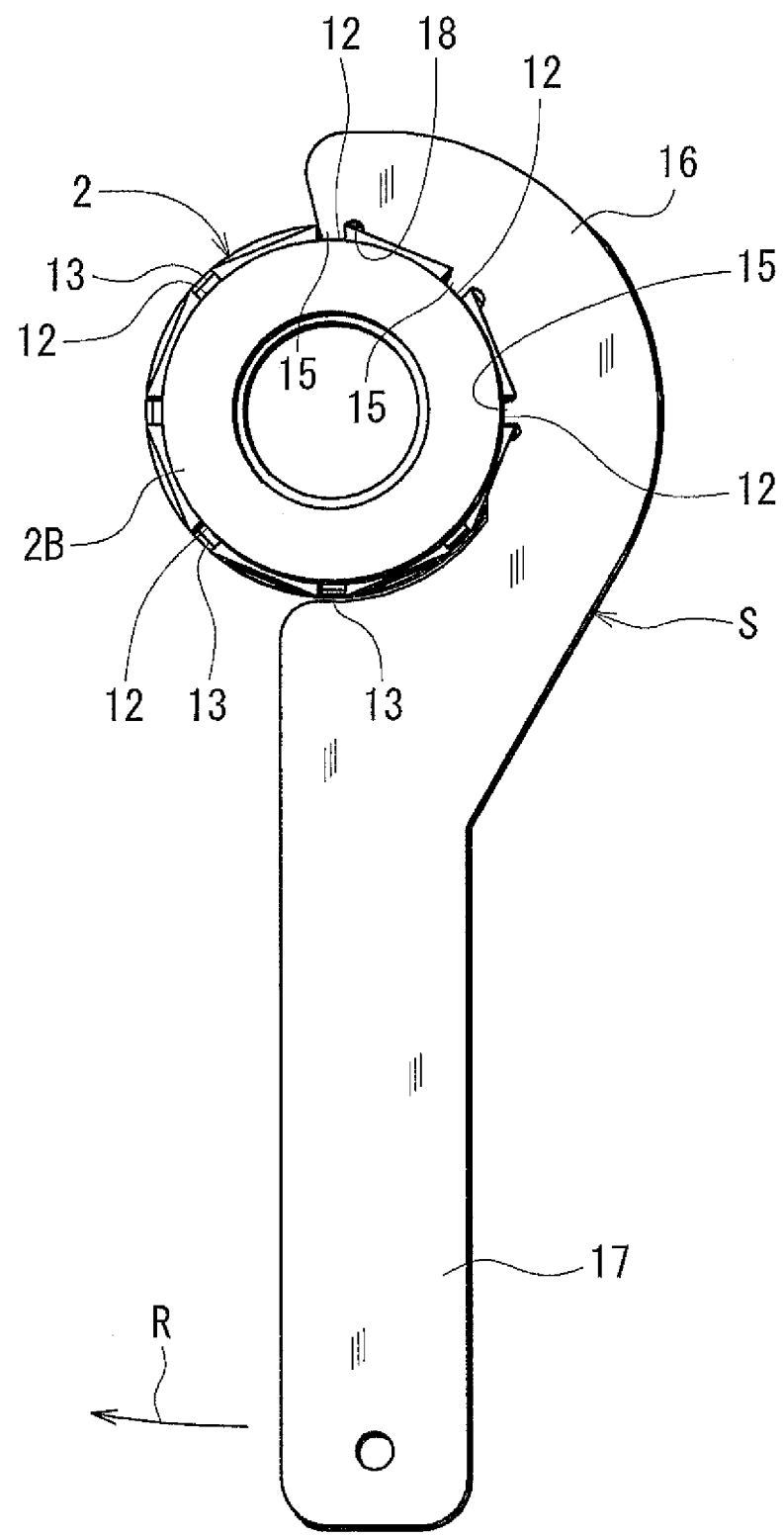
FIG. 9 is a function view showing a situation where the pipe joint nut is rotated by the hook wrench.

As shown in FIG. 9, then, an operation enabled state is attained where the three claws are normally inserted into the corresponding deep grooves 12, respectively. Thereafter, a force is given to the hand and finger (not shown) holding the handle portion 17 to move it in the direction of the arrow R, and the union nut 2 can be forcedly swung to be fastened.

Figure 12A:
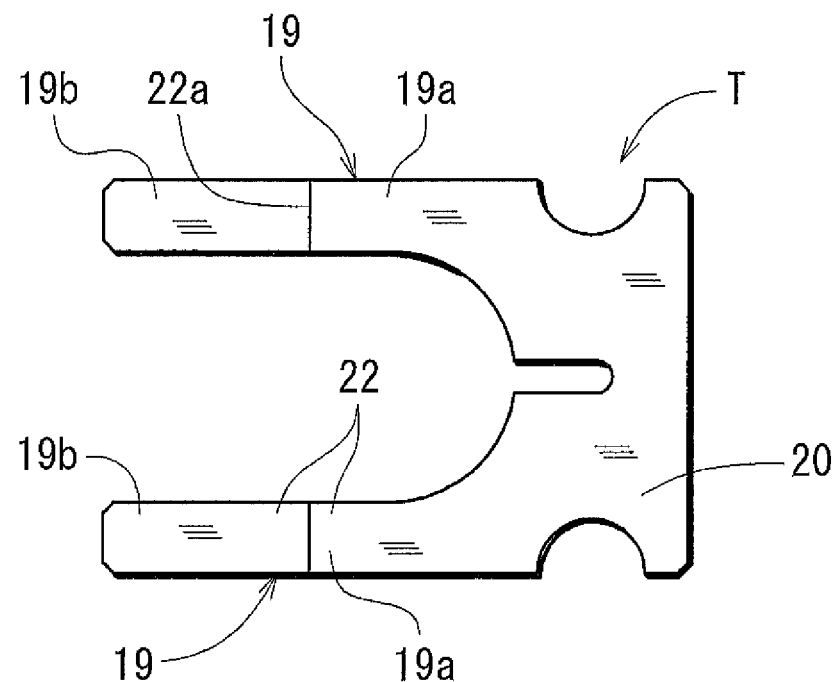
FIG. 12A is a front view.
Figure 12B:
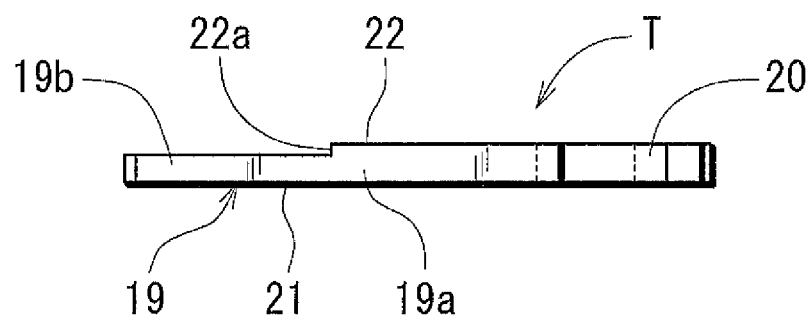
FIG. 12B is a side view.

Next, a testing jig T will be described. The pipe connecting device A sometimes includes a testing jig T which can test the fastening completion state in the case where the union nut 2 in which a temporal change occurred has been refastened. As shown in FIG. 12, the testing jig T is formed by a synthetic resin-made plate having a substantially U-like shape including bifurcated testing portions 19, 19 and a gripping portion 20. Each of the testing portions 19 includes a basal-end testing part 19a which is equal in thickness to the gripping portion 20, and a tip-end testing part 19b which is slightly smaller in thickness than the basal-end testing part 19a, and is formed into a component which has a stepped shape in a side view as shown in FIG. 12B.

Figure 13A:
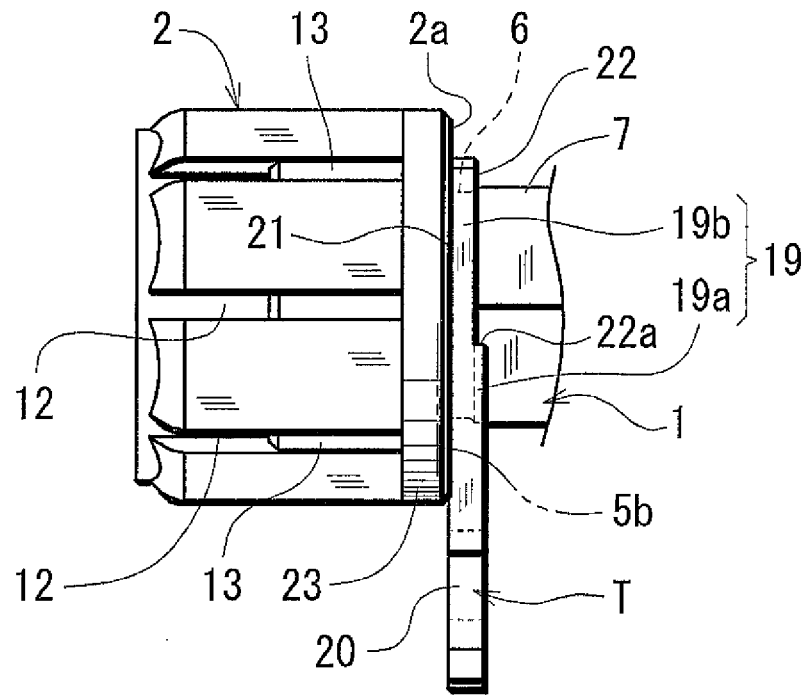
FIG. 13A is a side view of main portions.
Figure 13B:
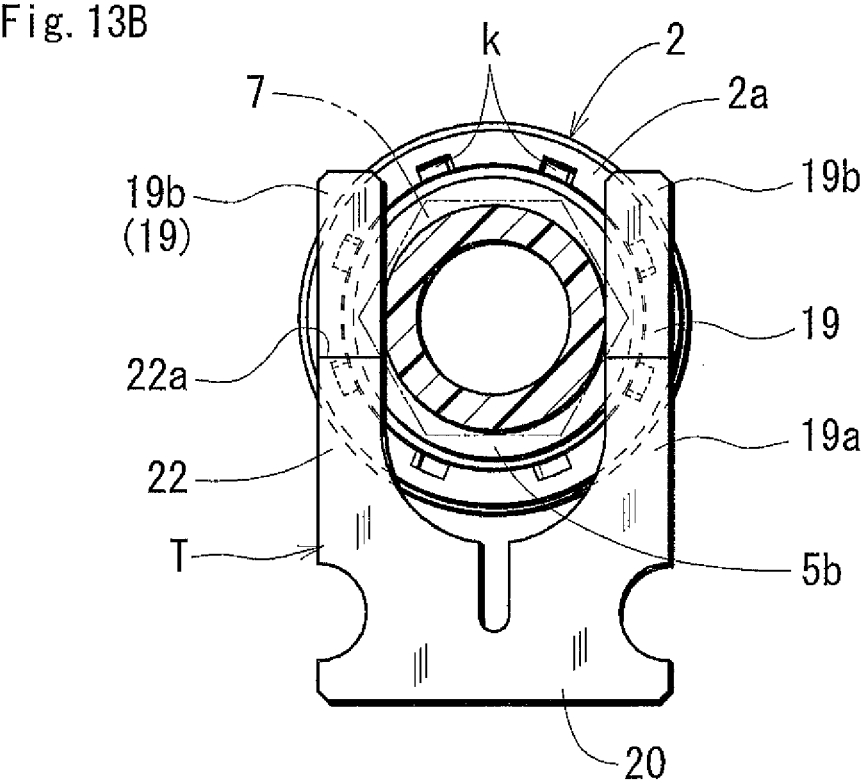
FIG. 13B is a front view of the main portions.

An example of the manner of using the testing jig T will be described. As shown in FIG. 13, the pair of testing portions 19, 19 in a posture in which their flat surfaces 21 having no step are directed toward the tip end surface 2a of the union nut 2 start to be inserted into the small-diameter trunk portion 6, and the testing jig T is inserted until step surfaces 22a of stepped surfaces 22 butt against the torque receiving portion 7. If, in this state, the tip-end testing parts 19b are sandwiched between the torque receiving portion 7 and the tip end surface 2a without forming a gap therebetween, it can be recognized that the refastening completion state is attained. Alternatively, the jig may be used while the flat surfaces 21 are directed toward the torque receiving portion 7.

Namely, the thickness of the tip-end testing parts 19b of the testing jig T coincides with the dimension of the gap between the tip end surface (an example of the tip end) 2a of the union nut 2 and the torque receiving portion 7 in a refastened state (refastening completion state) where the union nut 2 is further swung by a predetermined degree in the fastening direction in the fastening completion state (see FIGS. 1 and 11).

By contrast, by using the testing jig T, it is possible to check whether the fastening completion state of the pipe connecting device A is attained or not. When a state where the basal-end testing parts 19a can be inserted between the torque receiving portion 7 and the tip end surface 2a without forming a gap therebetween is attained as indicated by the phantom lines in the pipe connecting device A shown in the right side of the sheet of FIG. 10, it is possible to recognize the fastened state (fastening completion state) where the side peripheral wall 5b and the tip end surface 2a are in the same plane in the direction of the axes P, Q.

The functions, effects, and the like are as below (see (1) to (8)).

Figure 4A:
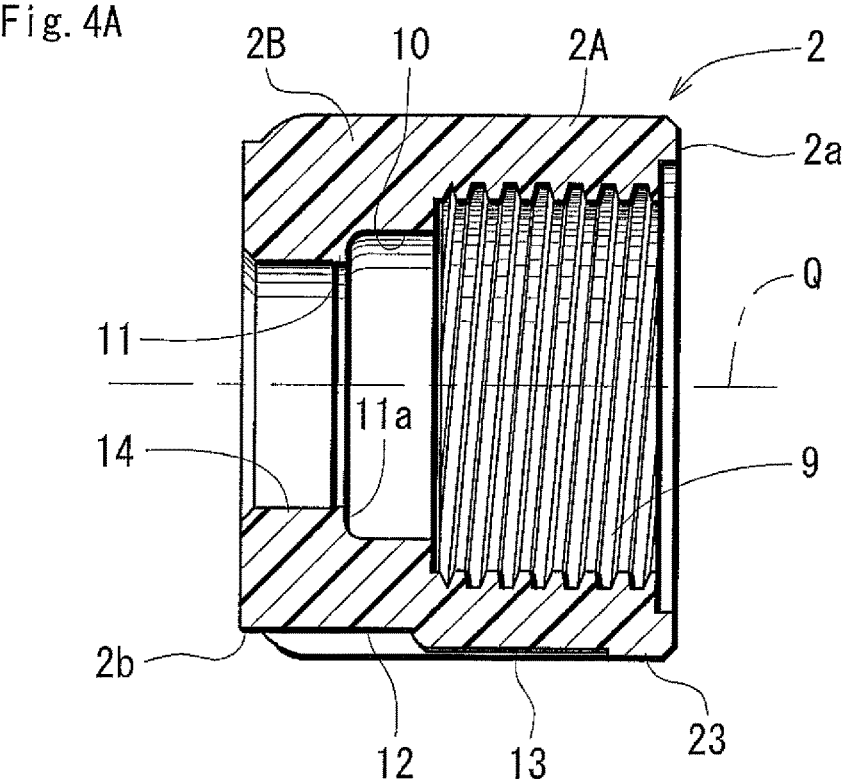
FIG. 4A is a sectional view.
Figure 4B:
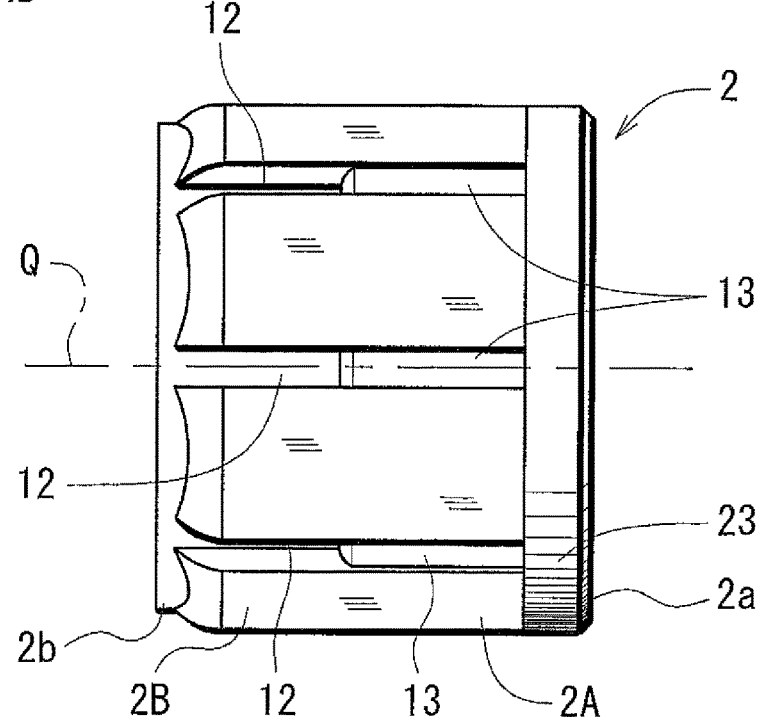
FIG. 4B is a side view.

(1) As shown in FIGS. 4 to 6, the union nut 2 through which the interior can be seen is used. Therefore, the fastening operation can be performed while transparently checking the screwed state between the internal thread 9 and the external thread 5. As compared with the case where the interior cannot be seen, it is possible to visually check whether the fastening completion state is attained in a small working environment or in a complicated portion or not, whether the state approaches the fastening completion state or not, and the like, and the workability is excellent. Moreover, the deep grooves 12 are formed in the nut thickened portion 2B in which the radial thickness is larger than that of the nut thinned portion 2A, and therefore it is possible to perform a rational design in which the union nut 2 can be made small in size while providing a sufficient strength.

(2) In the pipe connecting device A, as shown in FIG. 1, in the fastening completion state in which the tube pressing portion 11 is caused to press the diameter changing portion 3B by the screw advancement of the union nut 2, the screw advancement being produced by screwing the internal thread 9 to the external thread 5, the positions of the basal end of the external thread 5, i.e., the side peripheral wall 5b and the tip end of the union nut 2, i.e., the tip end surface 2a in the directions of the axis P (Q) are coincident with each other.

As shown in FIG. 10, as viewed in a direction intersecting with the axis P, when, as a result of a swinging operation, the tip end surface 2a of the fastening union nut 2, and the side peripheral wall 5b of the joint body 1 coincide with each other, and a state where the external thread 5 which has been visually checkable cannot be seen (the state drawn in the right side of the sheet of FIG. 10) is formed, therefore, the operation of rotating the union nut 2 may be stopped. At the moment, the assembling completion state is attained.

As shown in FIG. 11, when a visual check is performed in the direction of the arrow X perpendicular to that of the axis P, it is possible to easily check whether the tip end surface 2a and the side peripheral wall 5b are coincident with each other, i.e., whether the assembling completion state is attained or not.

(3) As shown in FIG. 11, the deep grooves 12 are formed so that, in the fastening completion state of the pipe connecting device A, the end in the direction of the axis P of the external thread 5 which is set to be substantially equal in length to the internal thread 9 is approximately coincident in position in the direction of the axis (P, Q) with the end in the direction of the axis Q of the deep grooves 12.

As shown in FIG. 11, therefore, when a visual check is obliquely performed in the direction of the arrow Y to see through the translucent union nut 2, more specifically, the nut thinned portion 2A, it is possible to distinguish whether the tip ends of the deep grooves 12 (the boundaries between the deep grooves 12 and the shallow grooves 13) and the tip end 5c of the external thread 5 coincide with or substantially coincide with each other. Therefore, it is possible to check whether the assembling completion state is attained or not.

This configuration functions as viewing means which is effective also in the case where, for example, a visual check in the direction of the arrow X cannot be performed, and is excellent because a visual check is enabled even in an operation state where the hook wrench S is engaged with the union nut 2.

(4) As shown in FIGS. 4 to 6, 11, and the like, the shallow grooves 13 are formed in the outer periphery of the union nut 2 so as to be continuous to the deep grooves 12. When slide movement after the claws 15 are hooked on the shallow grooves 13 is conducted, therefore, a swinging operation state where the claws 15 are easily engaged with the deep grooves 12 can be attained. Namely, the shallow grooves 13 can function as a guide for guiding the claws 15 of the hook wrench S to the deep grooves 12, and the design can be improved because the deep grooves 12 and the shallow grooves 13 are arranged in straight lines, respectively. Even in the case where the pipe connecting device A is placed in a narrow place or a less visible place, for example, the hook wrench S can be easily used as compared with the case where only the deep grooves 12 are formed. This is convenient.

(5) As shown in FIGS. 4 to 6, the mark portions k which are coincident in radial position related the axis Q with the deep grooves 12 and the shallow grooves 13 are formed on the tip end surface 2a of the union nut 2. Therefore, there is an advantage that visual checking of the mark portions k or touching of the mark portions with the finger facilitates the checking of the engagement positions of the claws 15 of the hook wrench S from the tip end side of the union nut 2 (the rear surface side of the nut).

(6) As shown in FIGS. 1 and 3, the joint body has: the small-diameter trunk portion 6 which has the outer diameter that is equal to or smaller than the diameter of the root 5a of the external thread 5; and the torque receiving portion 7 which is formed continuously with the small-diameter trunk portion 6 in the state where the diameter is set to a value which is equal to or smaller than the diameter of the root 5a, and equal to or larger than the diameter of the small-diameter trunk portion 6. While the small-diameter trunk portion 6 and the torque receiving portion 7 are provided with necessary strength, even in a situation where the coincidence of the positions in the direction of the axis P, Q of the basal end of the external thread 5, i.e., the side peripheral wall 5b, and the tip end surface 2a of the union nut 2 is compelled to be visually checked in an oblique direction, therefore, the visual check can be easily performed without being obstructed by the torque receiving portion 7 having the small diameter as indicated by the arrow Z in FIG. 11. Therefore, the workability of fastening is excellent.

(7) As shown in FIGS. 1 and 4, the external thread 5 of the joint body 1, and the internal thread 9 of the union nut 2 are formed by a trapezoidal thread, and hence the width and pitch of the ridges are larger than those in a usual screw (for example, a metric thread), so that the threads can be easily seen. As shown in FIG. 10, therefore, there is an advantage that the manner in which the external thread 5 is gradually screwed into the union nut 2 by the screw advancement of the union nut 2 to hide therein can be easily visually checked, and the workability of fastening is improved. Moreover, the strength of the ridges (thread line) can be enhanced, and therefore the configuration is suitable for production using a material which is relatively inferior in strength as compared with a metal, such as a synthetic resin.

(8) As shown in FIG. 13, the pipe connecting device has the testing jig T which is insertable between the tip end surface 2a of the union nut 2 and the torque receiving portion 7, and the thickness of the tip-end testing parts 19b of the testing jig T coincides with the dimension of the gap which is formed between the tip end surface 2a and the torque receiving portion 7 in a refastened state where, in the fastening completion state, the union nut 2 is further swung by a predetermined degree in the fastening direction. Although when a simple operation is performed in which the testing jig T is inserted between the tip end surface 2a of the union nut 2 and the torque receiving portion 7, therefore, it is possible to easily confirm that refastening is completed, or that the normal refastening degree is attained.

[Other Embodiments and the Like]

In the embodiment, the joint body 1 and the union nut 2 are formed by a translucent material through which the interior can be seen. These members may be made of a material which has no transparency, and through which the interior cannot be seen. The external thread 5 and the internal thread 9 may be configured by a thread other than a trapezoidal thread, such as a metric thread or an inch thread. Moreover, the pipe connecting device A which does not have the testing jig T may be employed. The pipe connecting device may have a shape other than the union shape, such as the elbow shape or the tee shape.

As the grooves or the recesses, in place of the deep grooves 12, hole-like recesses, or projections which have a wall surface that can receive a force in the torque applying direction, and which are radially projected may be employed. In summary, any configuration may be employed as far as engagement with the claws 15 of the hook wrench S is enabled. In the case where projections are disposed, the sides of the projections with which the claws 15 are to be engaged have a one-side concave shape, i.e., "grooves or recesses". The pipe connecting device may be a device having a union nut 2 which is not provided with the shallow grooves 13, or which does not have the mark portions k.

Marking portions in which the appearance can be easily recognized, such as engraved marks, projections, or recesses may be disposed at positions which are on the outer peripheral surface of the union nut 2, and which are separated by a predetermined distance from the tip end surface 2a on the side of the basal end. When the predetermined distance is set to be equal to the length of the external thread 5 in the direction of the axis P, for example, the coincidence of the marking portions and the tip end wall face 5c of the external thread 5 can be easily visually checked while seeing through the union nut 2.

DESCRIPTION OF REFERENCE NUMERALS 1 joint body
2 union nut
2A nut thinned portion
2B nut thickened portion
2a tip end
3 tube
3A flared portion of tube
3B diameter changing portion
3C non-flared portion of tube
4 fitting cylinder
5 external thread
5a root
5b basal end
6 small-diameter trunk portion
7 torque receiving portion
9 internal thread
11 tube pressing portion
12 groove or recess (deep groove)
13 shallow groove
15 claw
P axis of joint body
Q axis of union nut
S hook wrench
T testing jig
k mark portion

What is claimed is:

1. A pipe connecting device, comprising:
a hook wrench including claws,
a joint body including a fitting cylinder to which a flared portion of a synthetic resin-made tube is to be externally fitted, a radially outward side of said fitting cylinder comprising an external thread and an annular groove being disposed radially inward of said external thread so as to receive the flared portion of the tube, and
a union nut including an internal thread that is screwed with the external thread, a tube pressing portion that presses a diameter changing portion of the tube, which is formed between the flared portion and a non-flared portion of the tube, in a direction of an axis,
wherein the union nut has a nut thinned portion including the internal thread, and a nut thickened portion including the tube pressing portion, grooves or recesses, which are adapted to be engaged with the claws of the hook wrench when a rotational force is applied to the hook wrench, and the union nut is made of a synthetic resin having a transparency at which a radially inner side of the nut thinned portion is visible from a radially outer side,
wherein the grooves or recesses include first grooves and second grooves, said first grooves formed in an outer peripheral portion of the nut thickened portion and having a first depth and extending in the direction of the axis, and said second grooves having a second depth, said second depth being less than said first depth such that it is impossible for the claws of the hook wrench to engage the second grooves when the hook wrench is being rotated because the claws have a length that is longer than the second depth, said second grooves are formed in an outer peripheral portion of the nut thinned portion in a state where the second grooves are continuous to the first grooves, and a width of each groove or recess is less than a circumferential spacing between adjacent grooves or recesses,
wherein, in a fastening completion state in which the tube pressing portion is caused to press the diameter changing portion by a screw advancement of the union nut, the screw advancement being produced by screwing the internal thread to the external thread, positions of a basal end of the external thread and a tip end of the union nut in the direction of the axis are coincident with each other, and
wherein the union nut includes mark portions, radial positions of which are coincident with radial positions of the grooves or recesses, said mark portions being circumferentially spaced recesses on an outer most end surface, and said outer most end surface is in the direction of the axis of the nut thinned portion and opposite the nut thickened portion.

2. The pipe connecting device according to claim 1, wherein both the external thread and the internal thread, which is screwed with the external thread, are formed into a trapezoidal thread.

3. The pipe connecting device according to claim 1, wherein the grooves or recesses are formed so that, in the fastening completion state, the axial end of the external thread, which is set to be substantially equal in length to the internal thread, is approximately coincident in axial position with the axial ends of the grooves or recesses.

4. A pipe connecting device, comprising
a hook wrench including claws,
a joint body including a fitting cylinder to which a flared portion of a synthetic resin-made tube is to be externally fitted, and a radially outward side of said fitting cylinder comprising an external thread and an annular groove being disposed radially inward of said external thread so as to receive the flared portion of the tube;

a union nut including a nut thinned portion including an internal thread that is screwed with the external thread, a nut thickened portion including a tube pressing portion that presses a diameter changing portion of the tube, which is formed between the flared portion and a non-flared portion of the tube, in a direction of an axis, and grooves or recesses each having a rectangular section, which are adapted to be engaged with the claws of the hook wrench when a rotational force is applied to the hook wrench, each having a similar shaped section, formed in an outer peripheral portion of the union nut and, wherein the grooves or recesses include first grooves and second grooves, said first grooves formed in an outer peripheral portion of the nut thickened portion and having a first depth and extending in the direction of the axis, and said second grooves having a second depth, said second depth being less than said first depth such that it is impossible for the claws of the hook wrench to engage the second grooves when the hook wrench is being rotated because the claws have a length that is longer than the second depth, said second grooves are formed in an outer peripheral portion of the nut thinned portion in a state where the second grooves are continuous to the first grooves, wherein the union nut includes mark portions, radial positions of which are coincident with radial positions of the grooves or recesses, said mark portions being circumferentially spaced recesses on an outer most end surface, and said outer most end surface is in the direction of the axis of the nut thinned portion and opposite the nut thickened portion, and wherein, in a fastening completion state in which the tube pressing portion is caused to press the diameter changing portion by a screw advancement of the union nut, the screw advancement being produced by screwing the internal thread to the external thread, positions of a basal end of the external thread and a tip end of the union nut in the direction of the axis are coincident with each other, and wherein the joint body comprises:

a small-diameter trunk portion that has an outer diameter that is smaller than a diameter of a root of the external thread, and that is continued to the basal end of the external thread, said small-diameter trunk portion defining an outer surface that is substantially aligned with the annular groove whereby a radial distance from an axis of the pipe connecting device to the outer surface of the small-diameter trunk portion is substantially equal to a distance from the pipe connecting device axis to annular groove;

a torque receiving portion that is formed continuously with the small-diameter trunk portion, and that can support the joint body, and a diameter of the torque receiving portion is set to a value that is equal to or smaller than the diameter of the root of the external thread, and equal to or larger than a diameter of the small-diameter trunk portion.

5. The pipe connecting device according to claim 4, wherein the device includes a testing jig that is insertable between the tip end of the union nut and the torque receiving portion, and a thickness of the testing jig coincides with a dimension of a gap that is formed between the tip end of the union nut and the torque receiving portion in a refastened state where, in the fastening completion state, the union nut is further rotated by a predetermined degree in a fastening direction.

* * * * *